UNITED STATES PATENT OFFICE.

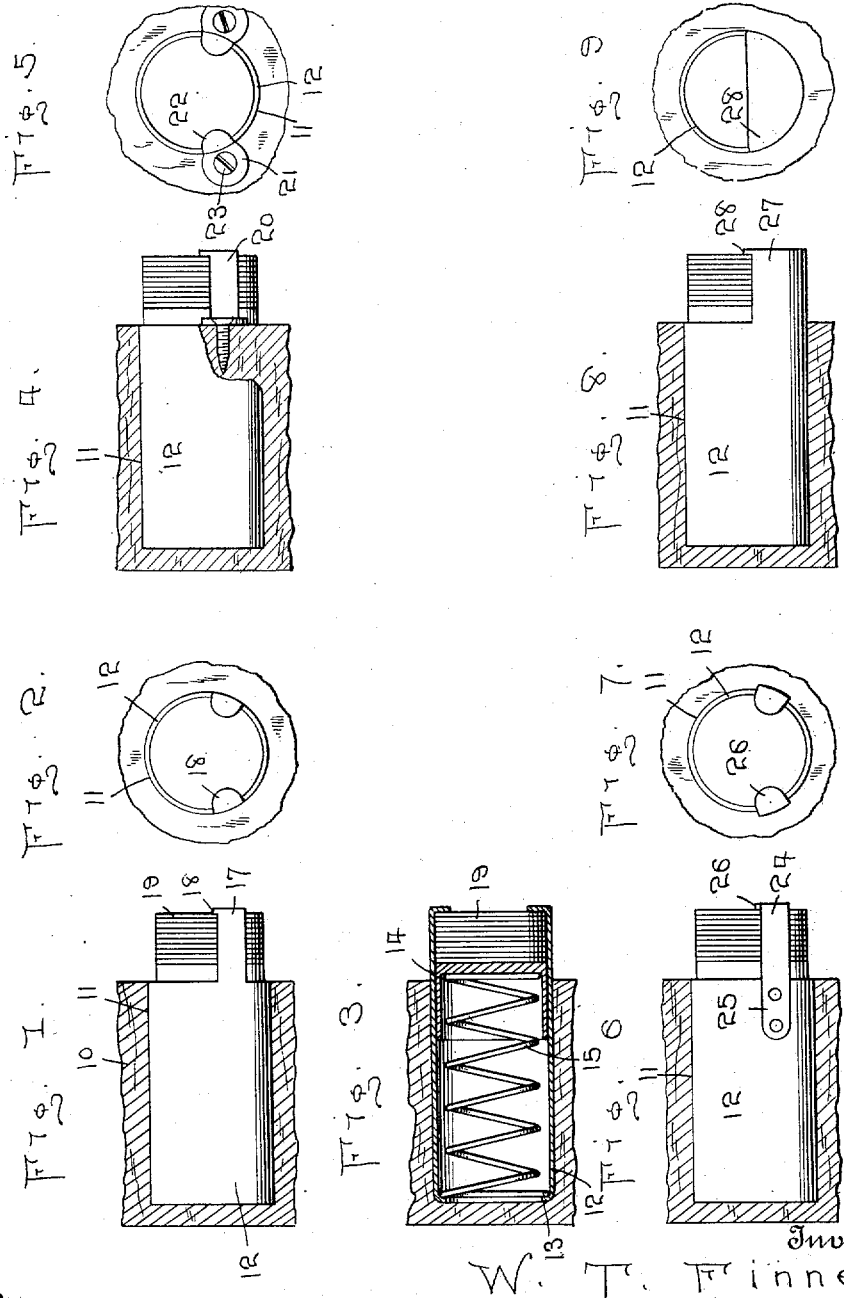

WILLIAM THOMAS FINNEGAN, OF DETROIT, MICHIGAN.

CHECK-HOLDER.

1,120,467.　　　　　Specification of Letters Patent.　　Patented Dec. 8, 1914.

Application filed July 27, 1912. Serial No. 711,874.

*To all whom it may concern:*

Be it known that I, WILLIAM THOMAS FINNEGAN, a citizen of the United States, residing at Detroit, in the county of Wayne and State of Michigan, have invented certain new and useful Improvements in Check-Holders; and I do hereby declare the following to be a full, clear, and exact description of the invention, such as will enable others skilled in the art to which it appertains to make and use the same.

My invention relates to new and useful improvements in check holders and the object of the invention is to provide a device whereby one or a plurality of check disks may be stored.

Other objects and advantages of my invention will be hereinafter made clearly apparent in the specification and pointed out in the claims.

In the accompanying drawings I have shown the preferred forms which my invention may take.

In said drawings, Figure 1 is a side elevation of one form of my invention, the support therefor being shown in section. Fig. 2 is an end view thereof. Fig. 3 is a longitudinal sectional view therethrough. Fig. 4 is an elevation showing slightly modified form of construction. Fig. 5 is an end view thereof. Fig. 6 is an elevation showing a further modified form of check holder. Fig. 7 is an end elevation thereof. Fig. 8 is a still further modified form of construction, and, Fig. 9 is an end elevation thereof.

Referring to the drawings by numerals of reference, similar numerals designating corresponding parts throughout the several views, 10 is a supporting base adapted to be arranged vertically and in which my check holders may be secured. In the drawings I have shown the supporting base 10 formed with horizontally arranged circular openings 11 therein, in which the check holders 12 are disposed.

The check holders 12 are tubular throughout the greater portion of their length and are provided with a preferably cup-shaped follower 14 slidably mounted therein. The inner end of the holders is preferably provided with an inwardly directed flange 13, against which the end of the spring 15 is seated, the other end of said spring being seated in said follower 14 and normally holding the same toward the open end of the holder, although I desire it to be understood that the flange 13 may be dispensed with and the spring seated directly against the base 10, or the inner end of the holders may be closed.

As shown in Fig. 1 the tubular casing 12 is cut away so as to leave a pair of arms 17, the outer ends of said arms being bent inwardly to form stops 18. The arms 17 are arranged at an angle of less than 180 degrees so that when the disks or checks 19, which are of a diameter substantially equal to the inner diameter of the casing 12, are disposed between the stops 18 and the outer end of the follower 14 they will be prevented from passing by said arm, but will be readily removable when moved in the opposite direction.

In Fig. 4 I have shown the tubular casing 12 of a length to completely fit in the opening 11 and have provided a pair of arms 20, which have apertured bases 21 and inwardly directed stops 22 at the outer ends, which are arranged similarly to the stops 18. The apertured bases 21 are secured to the bases 10 in any desired manner, as by means of screws 23.

In Figs. 6 and 7, I have shown a different form of arm, the casing 12 being the same in form as the casing shown in Fig. 4. The arms 24 are formed separately from the casing and are secured to the outer surface thereof by means of rivets 25, or in other desired manner, and the outer ends of said arms are provided with inwardly directed stops 26, while in Figs. 8 and 9 the casing is extended a considerable distance from the outer surface of the base 10 and is cut away slightly more than 180 degrees, so as to leave a single arm 27, and the end thereof is provided with an inwardly directed flange 28 which is in the path of the disks and the follower and serves as a stop therefor.

By referring particularly to Figs. 2, 5, 7 and 9, it will be seen that the stops 18, 22, 26 and 28, respectively, are arranged upon the lower half of a casing 12 so that the disks 19, which are of the same diameter as the follower 14, may be inserted between the follower and the stops and will be held directly in front of said follower, so that when a plurality of disks are inserted in place, the follower and a portion of said disks will recede into the casing.

When it is desired to remove one or more disks at the one time, it is only necessary to raise or lift them upwardly beyond the stops, when the spring will force the next succeeding disk forward until the first one engages the stops.

The invention herein described is particularly useful for use by employers who desire to keep check upon articles given out to their workmen, such as tools and supplies.

What I claim as new is:

1. The improved check holder herein described comprising a tubular casing, a support therefor, the inner end of said casing having an inwardly directed flange, said casing being cut away at its outer end, forming a pair of arms, the free ends of which are bent inwardly to form stops and the said arms being arranged at an angle of less than 180°, a follower in said casing, a spring interposed between said follower and said flange, and the whole adapted for use with disks of a diameter substantially equal to the inner diameter of said casing, said disks where interposed between said stops and the outer end of the follower being prevented from removal in one direction by said arms.

2. The improved check holder described, comprising a support with a cylindrical recess therein, a tubular casing disposed within said recess, and terminating flush with the outer wall thereof, a follower in said casing, a spring acting on said follower, said casing being provided with arms extending in the direction of the length thereof and flush with the inner and outer walls of the casing and having their free ends bent at an angle inwardly to form stop flanges, said follower being in engagement with said arms beyond the outer face of the casing, and the whole adapted for use with disks held between the follower and the flanges of said arms.

In testimony whereof I have signed my name to this specification in the presence of two subscribing witnesses.

WILLIAM THOMAS FINNEGAN.

Witnesses:
Wm. E. Henze,
Wilson Craig.

Copies of this patent may be obtained for five cents each, by addressing the "Commissioner of Patents. Washington, D. C."